Patented Jan. 2, 1934

1,942,208

UNITED STATES PATENT OFFICE 1,942,208

MEANS FOR OBTAINING LEAD IN METALLIC CONDITION

Paul Gamichon, Paris, France

Application June 12, 1931, Serial No. 543,822, and in France June 17, 1930

1 Claim. (Cl. 204—5)

This invention refers to a process and to means for obtaining metallic lead.

Said process is an entirely novel metallurgy of lead and consists essentially in bringing the lead by any known means to the state of a soluble compound (chloride, hydrate, mixture of hydroxide and chloride or the like) and thereafter submitting the soluble compound so obtained to electrolytic action in an electrolytic vat having suitable anodes and cathodes and means adapted to prevent the diffusion into the electrolyte of the gas generated at the anodes.

By this electrolysis a special spongeous lead is secured which is perfectly suited to the production of all lead compounds (red lead, litharge, carbonate and chromate of lead &c). One of the most useful of the novel purposes to which said kind of lead is suited is its direct application for the manufacture of the active material of storage battery plates. It may likewise be pressed and cast, if it is to be used in the metallic state.

The lead ore used as raw material may be brought by any known process into the condition of chloride of lead which is thereafter placed in solution in an electrolyte consisting of a brine. Such suitable processes consist in especial of one of those described in my patent for Process for converting into soluble salts lead and other metals contained in lead bearing ores, No. 1,905,460, dated April 25, 1933 and also my pending application for patent for Process for the treatment of ores containing lead, Serial No. 543,820, filed June 12, 1931.

The lead ore used as raw material may likewise be brought by any known process to the condition of a mixture of hydrate of oxide and eventually of chloride of lead which is thereafter placed in solution in an electrolyte consisting of an alkaline hydroxide (soda or other) or of an acid (nitric, acetic or other) and such suitable processes consist in especial of that described in my pending application for Process for securing compounds of lead, filed June 12, 1931, Serial No. 543,821.

If the lead has been secured in the condition of chloride of lead and it is desired to avoid every possible trace of chlorine in the electrolysis, said chloride may be converted into a lead hydrate which shall be soluble in the electrolytes above mentioned and for this purpose the chloride of lead may be precipitated by means of a base (alkaline or earth-alkaline hydroxide) the electrolyte so secured being purified, if desired, by peroxidation and by cementation in order to precipitate metals which are electro-negative relatively to lead.

The apparatus used to carry out this process may consist of an electrolytic vat having anodes adapted to resist the action of the gas generated therein and surrounded by diaphragm whereby said gas is retained and is discharged outside, cathodes adapted to withstand the action of the liquors and means for depolarizing the electrodes and recovering the lead deposited upon the cathodes.

The electrodes may be depolarized by means of movable cathodes or movable agitators adapted for use likewise as means for collecting the lead which has formed.

The electrodes may be two-poled, one of their faces acting as anode and having gas retaining diaphragms, whilst their other face acts as cathode and becomes coated with lead.

The attached drawing exemplifies, without limiting the scope of this invention, various constructional embodiments of electrolytic apparatuses suited to the fulfilment of this process. In said drawing.

Figure 1:
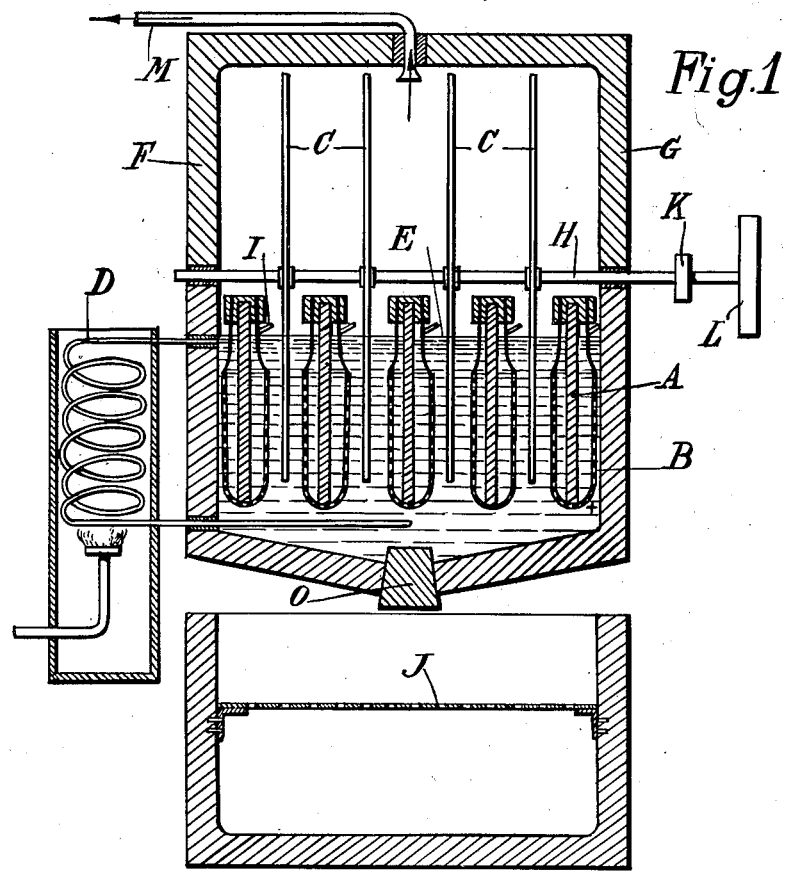
Fig. 1 is a vertical section of an electrolytic vat having electrodes in parallel.
Figure 2:
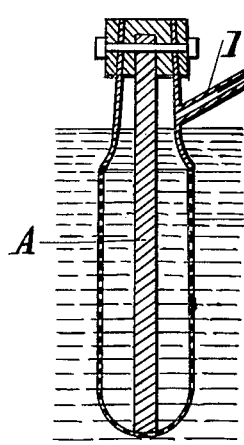
Fig. 2 is a view of detail of an anode, to a larger scale.

In Figs. 1 and 2, G is an electrolytic vat having a set of anodic plates A mounted in parallel. Said anodes must be adapted to withstand the action of the chlorine or of the oxygen generated therein and may conveniently consist of graphite or of lead, for example. They are all connected together to the same current feed terminal.

Each anode may be surrounded by a diaphragm B, in the shape of a closed bag and made of asbestos cloth, for example, to prevent the escape of the chlorine or of the oxygen which is led to a pipe I at the upper portion of each diaphragm. By means of a gas-tight cover F the chlorine or oxygen generated in the vat may be recovered, said gases being conducted by all of pipes I and being drawn through the header M by a fan and being used thereafter either for treating ores or for various manufacturing processes hypochlorite &c. or for other purposes.

The cathodes C consist of conductor plates adapted to with-stand the action of the liquors and not to soil the lead. Lead plates may be used, for instance. A practical method is to make these plates disc-shaped and to mount them upon a common shaft H having the negative current collector K. By this means all the cathodic plates may be connected electrically and if shaft H, carrying a pulley I, be turned intermittently, the bath may be depolarized and the lead deposited upon the discs may be detached and caused to fall into the vat.

The level of the liquor in the vat is shown at E. The solution may be re-heated by means of thermo-syphon D.

The vat may be emptied quickly through the aperture of a large bung O situated at its lower portion. The spongeous lead which has formed is separated from the electrolytic liquors with which it is carried, in a filter J, where it is conveniently gathered.

A very slow but continuous and regular movement might likewise be imparted to shaft H and the spongeous lead which has formed upon the cathodic discs C might be gathered by means of resilient scrapers, for example, whereby the liquors would drop back alone into vat G.

Stationary cathodes might likewise be provided, movable agitators being used to effect depolarization and, if desired, to gather the lead which has deposited upon the cathodes.

Figure 3:
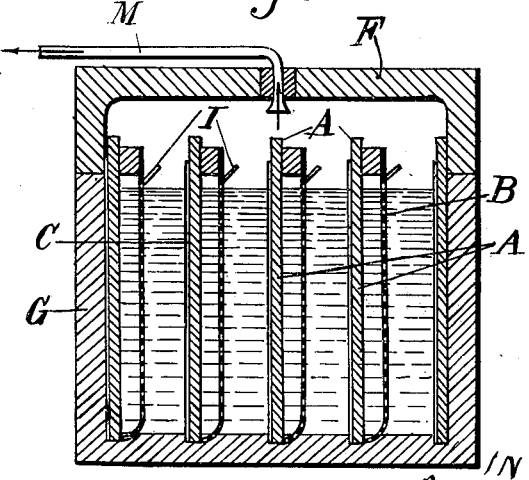
Fig. 3 is an alternative form of electrolytic vat.

Fig. 3 shows an alternative embodiment wherein each electrode is an anode as to one of its faces and a cathode as to the other face.

The principal advantage is that instead of use being made, as in the case of vats previously described, of large vats having a considerable flow of very low voltage and instead of great numbers of such vats having to be placed in series to furnish industrial voltage, each interior element of the two-pole electrode vat is disposed in series with the adjacent elements of the same vat. Use is thus made of a vat of relatively low intensity working at a voltage which may be adjusted at 50 or 110 V. according to the number of cells. Thus, each vat is made independent. This furthermore obviates the need for electric contacts at each electrode, whereby losses of electric current are greatly reduced.

The apparatus shown in Fig. 3 consists, as previously, of a vat G of suitable shape, semi-circular for choice, made of varnished wood or of paint-protected metal.

The vat is divided into compartments, which are practically hermetic in regard to each other, by preferably semi-circular electrodes A which fit, for example, in slots of the vat. Said electrodes are made of a conductor material which is not affected by the liquor and which does not soil the lead.

They are conveniently made, for example, of graphite plates which are left rough on the anode A side whilst being protected at the cathode C side by a coating of lead or of plates wholly of lead.

The plates are fitted at their anodic A side with diaphragm B consisting, for example, of asbestos cloth. Said diaphragm constitutes the upper portion of a closed bag whence the chlorine or oxygen is discharged without loss by means of a small duct I connected to the main suction header M.

The whole of the vat may be covered by a gas-tight cover F, carrying the header M.

The vat may be equipped with any mechanical means (not shown) for the purpose of gathering the deposited lead.

In the case of the electrolysis of hydrate, hydroxide, of lead, instead of the oxygen being allowed to generate at anodes, it might be caused to react in the electrolytic bath, so as to create any desired lead oxide ($PbO$, $Pb_3O_4$, $PbO_2$, etc.).

I claim:

An electrolytic apparatus for producing spongeous lead which comprises two poled electrodes, one of their faces acting as cathode and their other face, fitted with a diaphragm to arrest the generated gases, acting as anode, means for discharging the gases outside, means for depolarizing the electrodes and means for recovering the spongeous lead deposited on the parts of the electrodes acting as cathode.

PAUL GAMICHON.